(12) United States Patent
Oki et al.

(10) Patent No.: US 7,500,310 B2
(45) Date of Patent: Mar. 10, 2009

(54) METHOD OF MAKING A COMPONENT PART OF A RECLINING DEVICE

(75) Inventors: Yasukazu Oki, Hiroshima (JP); Shigeki Teraoka, Hiroshima (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 264 days.

(21) Appl. No.: 11/493,575

(22) Filed: Jul. 27, 2006

(65) Prior Publication Data

US 2007/0143982 A1    Jun. 28, 2007

(30) Foreign Application Priority Data

Dec. 26, 2005    (JP) ............................. 2005-372379

(51) Int. Cl.
*B21D 53/00* (2006.01)

(52) U.S. Cl. ........................ 29/893; 29/893.1; 29/893.3; 148/573; 297/366

(58) Field of Classification Search ................. 29/893.1, 29/893.2, 893.3, 559, 893; 148/573, 224; 297/366, 367
See application file for complete search history.

(56) References Cited

U.S. PATENT DOCUMENTS

| | | | |
|---|---|---|---|
| 5,224,997 A | 7/1993 | Grilloud et al. | |
| 5,590,931 A | 1/1997 | Fourrey et al. | |
| 6,010,191 A | 1/2000 | Calinaud et al. | |
| 2002/0043521 A1 | 4/2002 | Klein et al. | |
| 2003/0102704 A1 | 6/2003 | Pollack | |

FOREIGN PATENT DOCUMENTS

| JP | 54112710 A | * | 9/1979 |
|---|---|---|---|
| JP | 58-197223 | | 11/1983 |
| JP | 62-067110 | | 3/1987 |
| JP | 4-280914 | | 10/1992 |
| JP | 6-316722 | | 11/1994 |
| JP | 7-148585 | | 6/1995 |
| JP | 8-13037 | | 1/1996 |
| JP | 8-337821 | | 12/1996 |
| JP | 10-276850 | | 10/1998 |
| JP | 11-20517 | | 1/1999 |
| JP | 2003-517934 | | 6/2003 |
| JP | 2003-221622 | | 8/2003 |
| JP | 2004-28181 | | 1/2004 |
| JP | 2004-57378 | | 2/2004 |

* cited by examiner

*Primary Examiner*—Jermie E Cozart
(74) *Attorney, Agent, or Firm*—Wenderoth, Lind & Ponack, L.L.P.

(57) ABSTRACT

In making a component part of a reclining device that is used to adjust an inclination of a seat back with respect to a seat cushion, after the component part has been prepared, a predetermined portion of the component part is selectively heated up to a temperature greater than a transformation point of a material of the component part, and the component part is then cooled. During this heat treatment, portions of the component part other than the predetermined portion are left as a base material to thereby selectively increase the strength or the wear and abrasion resistance of the component part.

6 Claims, 5 Drawing Sheets

METHOD OF MAKING A COMPONENT PART OF A RECLINING DEVICE

BACKGROUND OF THE INVENTION

1. Field of the Invention

The present invention relates to a reclining device attached to, for example, an automobile seat for appropriately adjusting inclination of a seat back with respect to a seat cushion and, in particular but not exclusively, to a method of making a component part of the reclining device.

2. Description of the Related Art

A reclining device is interposed between a seat cushion and a seat back that can be inclined relative to the seat cushion. A conventional reclining device generally includes a guide bracket fixed to one of the seat cushion and the seat back and an internal gear fixed to the other of the seat cushion and the seat back so as to be rotatable relative to the guide bracket.

The internal gear is first formed of a material having good press workability and then comes to have a predetermined surface hardness by a carburizing and hardening treatment and a subsequent tempering treatment in order to satisfy the strength requirements and the wear and abrasion resistance requirements.

The reclining device as disclosed in Japanese Laid-Open Patent Publication No. 10-276850 includes a first housing and a second housing opposed to each other. Each of the first and second housings has a plurality of projections integrally formed therewith on a side surface thereof, and each of a seat cushion frame and a seat back frame has a plurality of holes defined therein, into each of which one of the plurality of projections is inserted for subsequent welding thereof to the first or second housing, thereby joining the reclining device to the seat frame.

Japanese Laid-Open Patent Publication No. 11-20517 discloses another reclining device having a hardened layer that has been formed in an internal gear by induction hardening. The internal gear has a flange, on an inner peripheral surface of which internal teeth are formed, and the induction hardening is effected by induction heating the internal teeth from inside the flange using a high frequency and by subsequently cooling the internal teeth.

In the case of the reclining device as disclosed in Japanese Laid-Open Patent Publication No. 10-276850, because there is a possibility that a large load may be applied to the reclining device due to, for example, a vehicle collision, the plurality of projections formed with each housing must be made large, resulting in an increase in size of the reclining device. Further, a steel product that has undergone the carburizing and hardening treatment and the subsequent tempering treatment, i.e., the internal gear contains a considerable quantity of carbon in a surface layer thereof and, hence, it is most likely that weld cracks such as, for example, under-bead cracks may occur in the internal gear.

On the other hand, in the case of the reclining device as disclosed in Japanese Laid-Open Patent Publication No. 11-20517, when the internal teeth are heated from inside the flange, a connection between the flange and a portion of the internal gear positioned radially inwardly of the flange is also heated to thereby deform the flange, making it difficult to sufficiently ensure the accuracy after the hardening.

SUMMARY OF THE INVENTION

The present invention has been developed to overcome the above-described disadvantages.

It is accordingly an objective of the present invention to provide a method of making a component part of a small-sized reclining device capable of sufficiently ensuring the desired accuracy while avoiding weld cracks.

In accomplishing the above and other objectives, the method according to the present invention is intended to make a component part of a reclining device that is used to adjust an inclination of a seat back with respect to a seat cushion, and includes preparing the component part, selectively heating a predetermined portion of the component part up to a temperature greater than a transformation point of a material of the component part, cooling the component part, and leaving portions of the component part other than the predetermined portion as a base material to thereby selectively increase a strength or a wear and abrasion resistance of the component part.

The reclining device generally includes a guide bracket to be secured to one of the seat cushion and the seat back, an internal gear to be secured to the other of the seat cushion and the seat back, a cam rotatably mounted between the guide bracket and the internal gear, and a pair of lock gears interposed between the guide bracket and the internal gear so as to be radially slidable in association with rotation of the cam. The component part made by the method according to the present invention includes at least one of the guide bracket, the internal gear, the cam, and the pair of lock gears.

The guide bracket includes a plurality of guide members for guiding the pair of lock gears so as to be slidable relative thereto.

In an aspect of the present invention, heat treatment is selectively conducted with respect to a portion of an entire outer circumference of each of the plurality of guide members. Advantageously, the heat treatment is conducted while the guide bracket is inclined and being rotated with respect to a heating source, and the heating source is being moved.

In another aspect of the present invention, heat treatment is selectively conducted with respect to internal teeth of the internal gear. In this case, the heat treatment is conducted from inside the internal teeth while the internal gear is inclined and being rotated with respect to a heating source.

In a further aspect of the present invention, heat treatment is selectively conducted with respect to teeth of the pair of lock gears that are engageable with internal teeth of the internal gear. Heat treatment may be selectively conducted with respect to portions of the pair of lock gears that are brought into contact with the cam. Further, heat treatment may be selectively conducted with respect to a portion of the cam that is brought into contact with the pair of lock gears.

It is preferred that a laser be employed as a heating source. Advantageously, the laser is a semiconductor laser.

According to the present invention, after the component part of the reclining device has been prepared, hardening and tempering are conducted with respect to a predetermined portion of the component part that is required to have a predetermined strength or wear and abrasion resistance with the remaining portions left as a base material. Accordingly, even if such remaining portions are welded to a separate member, no weld cracks occur, making it possible to ensure the desired accuracy.

Moreover, it is not necessary to increase the size of projections or like members that are to be welded to a separate member and, hence, the size of the reclining device can be reduced.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on an application No. 2005-372379 filed Dec. 26, 2005 in Japan, the content of which is herein expressly incorporated by reference in its entirety.

Figure 1:
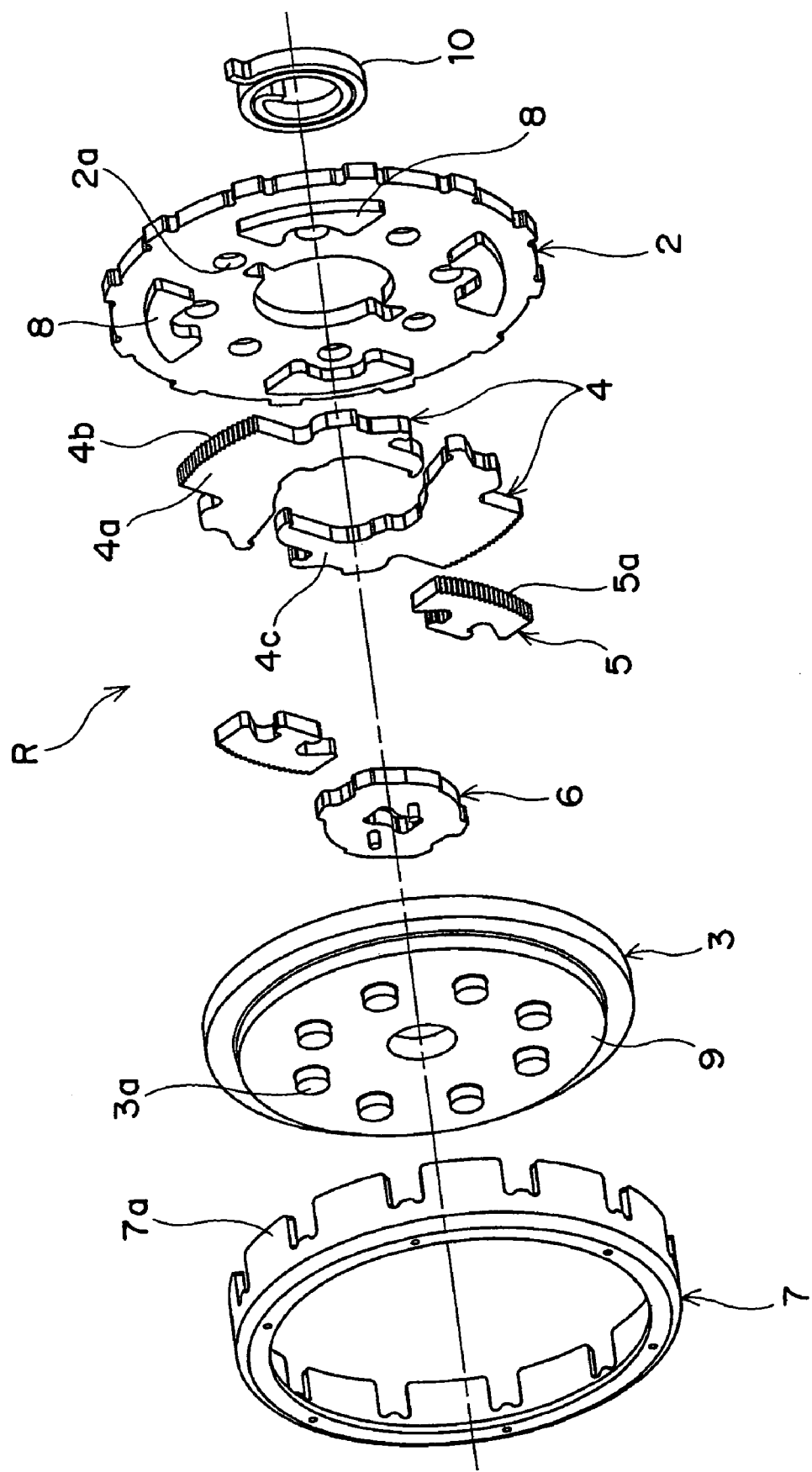
FIG. 1 is an exploded perspective view of a reclining device to which the present invention is applied.

FIG. 1 depicts a reclining device R that is to be mounted on respective sides of, for example, an automobile seat to change inclination of a seat back (not shown) relative to a seat cushion (not shown).

The reclining device R includes a guide bracket 2 to be secured to one of the seat cushion and the seat back, an internal gear 3 to be secured to the other of the seat cushion and the seat back so as to confront the guide bracket 2, a pair of lock gears 4 interposed between the guide bracket 2 and the internal gear 3, a pair of auxiliary lock gears 5 interposed between the guide bracket 2 and the internal gear 3, and a cam 6 operable to move the pair of lock gears 4 towards and away from internal teeth of the internal gear 3. The guide bracket 2 and the internal gear 3 are assembled together by a mounting ring 7 with the lock gears 4, the auxiliary lock gears 5 and the cam 6 accommodated therein. The cam 6 is coupled to an operating lever (not shown), and upon operation of the operating lever, the cam 6 is rotated to radially slide the lock gears 4, followed by a radial sliding movement of the auxiliary lock gears 5.

The guide bracket 2 is formed into a generally round plate and has a pair of (front and rear) upper guide members 8 and a pair of (front and rear) lower guide members 8 formed therewith on an inner surface thereof so as to protrude inwardly in the widthwise direction thereof. The pair of upper guide members 8 have respective side walls extending parallel to each other that confront an associated one of the lock gears 4 and define a first guide groove therebetween in which a portion (engaging portion) of the associated one of the lock gears 4 is slidably received. The same is true of the pair of lower guide members 8. Similarly, the upper and lower guide members 8 confronting each other have respective side walls extending parallel to each other that confront an associated one of the auxiliary lock gears 5 and define a second guide groove therebetween in which one of the auxiliary lock gears 5 is slidably received. The first guide grooves extend in a direction orthogonal to a direction in which the second guide grooves extend. The guide bracket 2 also has a plurality of equally spaced mounting pins (pin-shaped protrusions) 2a formed therewith around a central hole (operating lever insertion hole) so as to protrude outwardly in the widthwise direction thereof. The plurality of mounting pins 2a are to engage with a mounting bracket (not shown) that is secured to one of the seat cushion and the seat back. The guide members 8 and the mounting pins 2a are unitarily formed with the guide bracket 2 by pressing predetermined portions of the guide bracket 2.

The internal gear 3 has a generally round shape and also has a round protrusion 9 formed therewith on an outer surface thereof so as to protrude outwardly in the widthwise direction thereof. The round protrusion 9 has a plurality of equally spaced mounting pins (pin-shaped protrusions) 3a formed therewith around a central hole so as to protrude outwardly in the widthwise direction thereof. The plurality of mounting pins 3a are to engage with a mounting bracket (not shown) that is secured to the other of the seat cushion and the seat back. Similar to the mounting pins 2a, the mounting pins 3a are unitarily formed with the internal gear 3 by pressing predetermined portions of the internal gear 3. The round protrusion 9 also has a round inner side wall, on which internal teeth 3b (see FIG. 2) are formed so as to confront the lock gears 4 and the auxiliary lock gears 5.

Each lock gear 4 includes an engaging portion 4a slidably received in one of the first guide grooves in the guide bracket 2. The engaging portion 4a has engaging teeth 4b formed at a distal end thereof so as to be engageable with the internal teeth 3b of the internal gear 3. Each auxiliary lock gear 5 is slidably received in one of the second guide grooves in the guide bracket 2 and has engaging teeth 5a formed at a distal end thereof so as to be engageable with the internal teeth 3b of the internal gear 3.

The cam 6 is almost hexagonal and has three (first, second and third) corners confronting one of the lock gears 4 and three (fourth, fifth and sixth) corners confronting the other of the lock gears 4. When the cam 6 is in a locking position in which the lock gears 4 and the auxiliary lock gears 5 engage with the internal teeth 3b of the internal gear 3, the first and second corners of the cam 6 press one of the lock gears 4 radially outwardly, while the fourth and fifth corners of the cam 6 similarly press the other of the lock gears 4 radially outwardly. At this time, the auxiliary lock gears 5 are pressed radially outwardly by the lock gears 4. Under this condition, when the operating lever connected to the cam 6 is operated, the cam 6 is rotated, and the third corner of the cam 6 presses a protrusion formed on a leg portion 4c of one of the lock gears 4 radially inwardly, while the sixth corner of the cam 6 similarly presses a protrusion formed on a leg portion 4c of the other of the lock gears 4 radially inwardly. As a result, the lock gears 4 and the auxiliary lock gears 5 are caused to slide radially inwardly, thereby releasing the engagement between the lock gears 4 and the internal teeth 3b of the internal gear 3 and the engagement between the auxiliary lock gears 5 and the internal teeth 3b of the internal gear 3.

In assembling the reclining device R, the guide bracket 2 and the internal gear 3 are first mated together with the lock gears 4, the auxiliary lock gears 5, and the cam 6 interposed therebetween, and the mounting ring 7 is subsequently mounted on the internal gear 3 and the guide bracket 2 from the side of the internal gear 3. The assemblage of the reclining device R is completed by bending mounting pieces 7a formed at a distal end of the mounting ring 7 inwardly by about 90 degrees.

Upon completion of the assemblage of the reclining device R, each of the mounting pins 2a of the guide bracket 2 is inserted into one of mounting pin insertion holes defined in the mounting bracket that has been secured to one of the seat cushion and the seat back, and the mounting pins 2a are then welded to the mounting bracket. Each of the mounting pins 3a of the internal gear 3 is similarly inserted into one of mounting pin insertions holes defined in the mounting bracket that has been secured to the other of the seat cushion and the seat back, and the mounting pins 3a are then welded to the mounting bracket. By so doing, the reclining device R is held between the two mounting brackets.

When the reclining device R of the above-described construction is in a normal condition in which a user sits on the seat, the four corners of the cam 6 press inner peripheral surfaces (surfaces opposite to the engaging teeth 4b) of the pair of lock gears 4 radially outwardly by means of the elastic force of a spiral spring 10 to thereby engage the engaging teeth 4b of the lock gears 4 with the internal teeth of the internal gear 3 and, at the same time, the engaging portion 4a of each lock gear 4 is held in contact with one of the two guide members 6 positioned on respective sides of the lock gear 4, thereby holding the seat back at a predetermined angle. At this time, a predetermined load is applied to each of the following portions.

the inner peripheral surfaces of the lock gears 4 and the four corners of the cam 6 the engaging teeth 4b of the lock gears 4 and the internal teeth 3b of the internal gear 3 the engaging portions 4a of the lock gears 4 and the side surfaces of the guide members 8 held in contact therewith In the case of a vehicle collision and, in particular, a rear-end collision, a larger load is applied to the above-described portions, which in turn maintain the predetermined angle of the seat back while withstanding such a load.

The same is true of the auxiliary lock gears 5, and a predetermined load or a large load is applied to each of the following portions.

the engaging teeth 5a of the auxiliary lock gears 5 and the internal teeth 3b of the internal gear 3 the auxiliary lock gears 5 and the side surfaces of the guide members 8 held in contact therewith In the practice of the present invention, of the component parts of the reclining device R, the aforementioned portions to which the predetermined load or the large load is applied are partially hardened to have a predetermined hardness and a predetermined wear and abrasion resistance sufficient to withstand such a load.

A detailed explanation is made hereinafter, taking the case of the internal gear 3. After the internal gear 3 has been made of a predetermined material, only the aforementioned portions of the internal gear 3 are selectively heated up to a temperature that is greater than a transformation point thereof but less than a melting point thereof for a hardening treatment, while the mounting pins 3a of the internal gear 3 that are to be welded to the mounting bracket secured to the seat cushion or the seat back are left as a base material thereof, followed by a tempering treatment, thereby increasing the strength and the wear and abrasion resistance of the predetermined portions of the internal gear 3.

EXAMPLE 1

Figure 2:
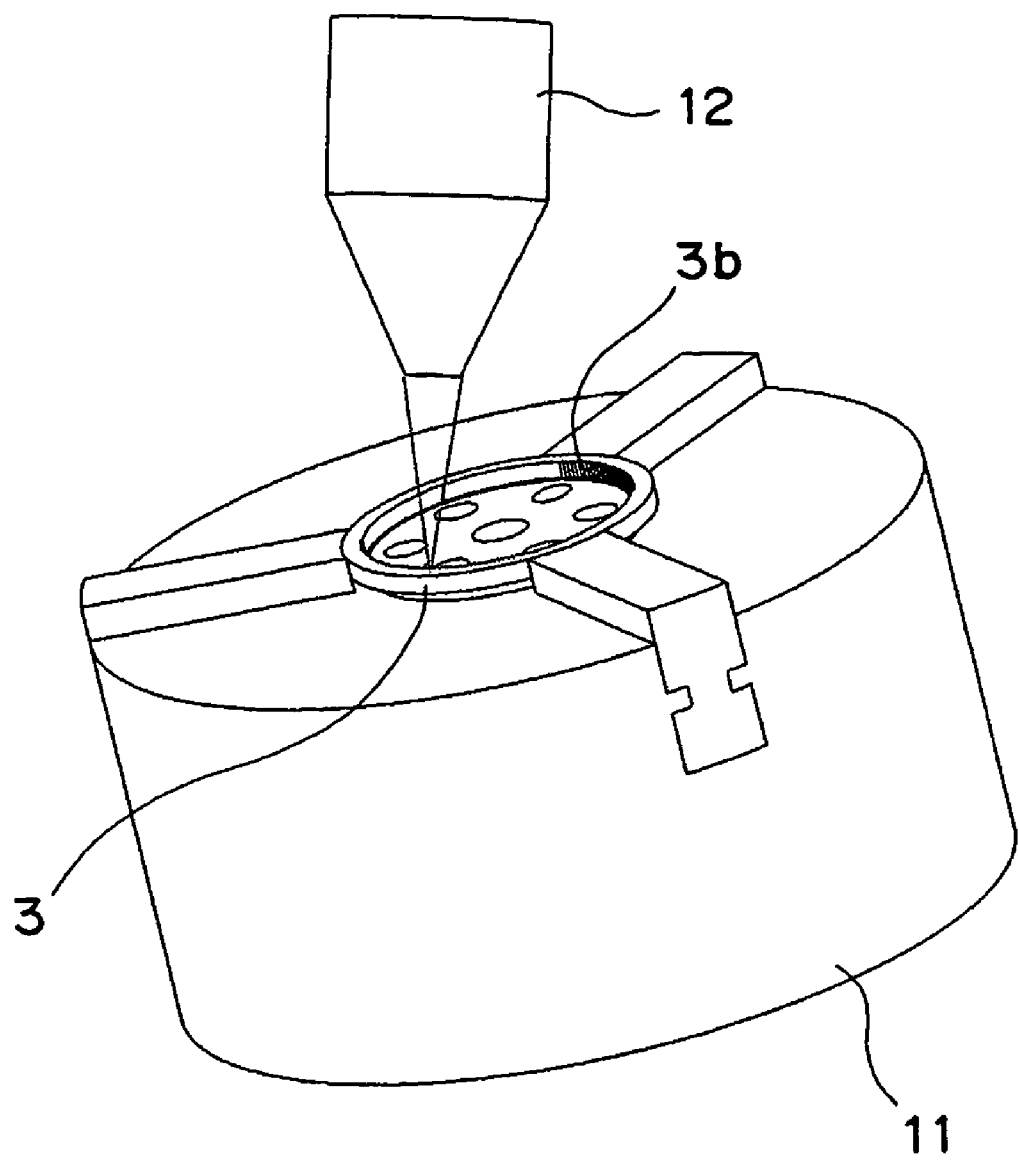
FIG. 2 is a perspective view of a semiconductor laser beam machine, depicting the condition in which heat treatment is being conducted with respect to an internal gear constituting the reclining device of FIG. 1.

FIG. 2 depicts the condition in which the internal gear 3 was mounted on a rotating jig 11 and a predetermined portion (internal teeth 3b) of the internal gear 3 was being hardened using a semiconductor laser beam machine 12. The rotating jig 11 was inclined, and a laser beam was irradiated from right above while the rotating jig 11 was being rotated, so that the internal teeth 3b might be heated obliquely from inside up to a temperature greater than a transformation point but less than a melting point of the material of the internal gear 3. Thereafter, the internal teeth 3b were gradually cooled down in the atmosphere. The material of the internal gear 3, the processing conditions, and the like were as follows.

Internal gear 3
Material: S28CB
Angle of inclination: 30 to 60 degrees
Heating source (semiconductor laser)
Focal length: 200 to 250 mm
Wavelength: 0.94 μm
Spot size: 7×6 mm
Laser output: 1000 to 1500 W
Processing speed: 500 to 1000 mm/min.
Beam absorbent: absent In the case of the semiconductor laser, because the beam wavelength is short, heat was absorbed into the gear and, hence, a desired heat treatment was accomplished without any beam absorbent, and the portions irradiated did not melt.

Figure 3:
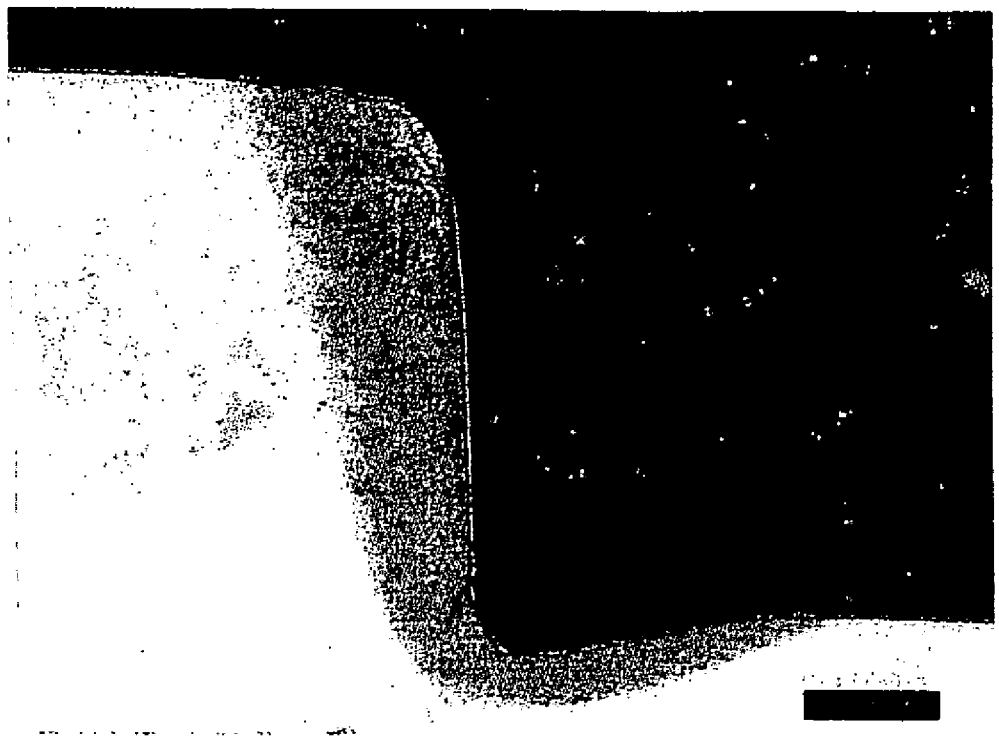
FIG. 3 is a photograph of a cross-section of internal teeth of the internal gear that underwent the heat treatment.

FIG. 3 is a photograph of a cross-section of the internal teeth 3b of the internal gear 3 that underwent the above-described heat treatment. The cross-section was obtained by radially cutting one of the internal teeth 3b from a tip thereof.

Figure 4:
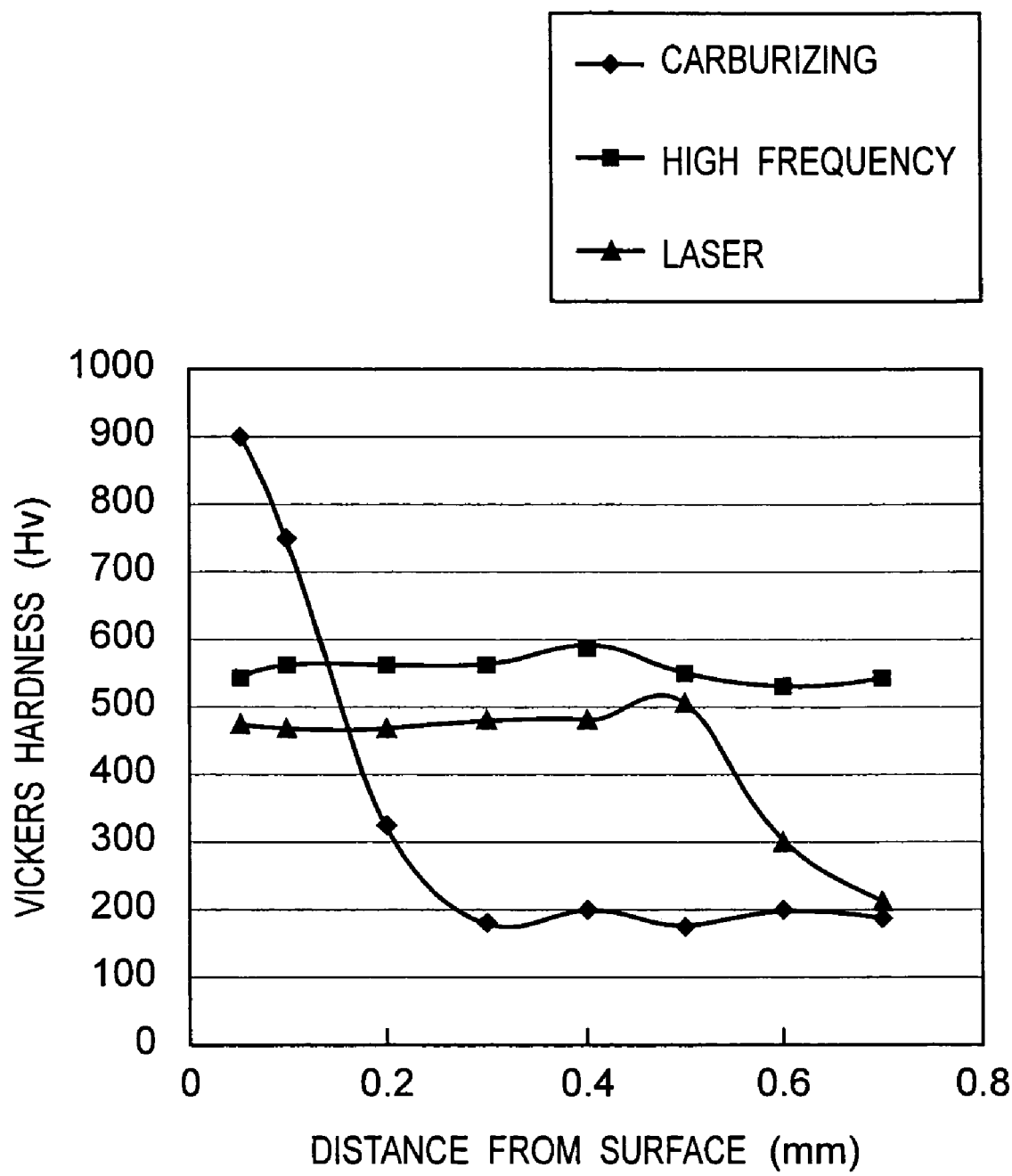
FIG. 4 is a graph indicating the surface hardness of the internal gear.

FIG. 4 is a graph indicating the surface hardness of the internal gear 3 as measured radially outwardly from the tip of one of the internal teeth 3b, when hardening was conducted with respect to the internal teeth 3b using a semiconductor laser, a high-frequency, and a carburizing and hardening treatment.

The graph of FIG. 4 reveals that the laser hardening or the high-frequency hardening provides a thick hardened layer, compared with the carburizing and hardening treatment.

EXAMPLE 2

Figure 5:
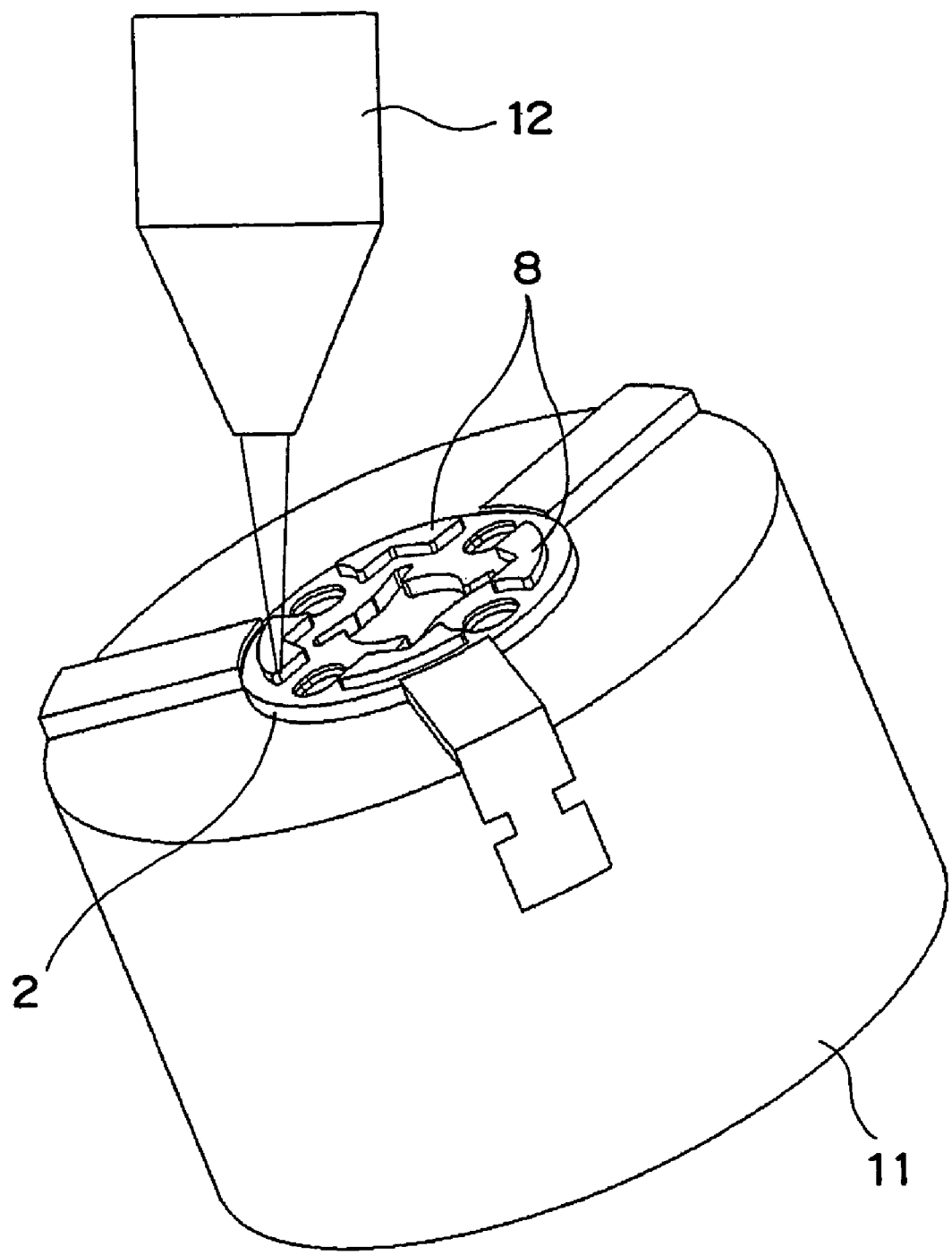
FIG. 5 is a perspective view of the semiconductor laser beam machine, depicting the condition in which heat treatment is being conducted with respect to a guide bracket constituting the reclining device of FIG. 1.

FIG. 5 depicts the condition in which the guide bracket 2 was mounted on the rotating jig 11 and a predetermined portion (guide member 8) of the guide bracket 2 was being hardened using the semiconductor laser beam machine 12. The rotating jig 11 was inclined, and a laser beam was irradiated from right above while the rotating jig 11 was being rotated and, at the same time, a processing head of the semiconductor laser beam machine 12 was being moved in three-dimensional directions, so that an outer peripheral surface of the guide member 8 might be heated obliquely from outside up to a temperature greater than a transformation point but less than a melting point of the material of the guide bracket 2. Thereafter, the outer peripheral surface of the guide bracket 2 so heated was gradually cooled down in the atmosphere. The material of the guide bracket 2, the processing conditions, and the like were as follows.

Guide bracket 2
Material: S22CB
Angle of inclination: 30 to 60 degrees

Heating source (semiconductor laser)
Focal length: 200 to 250 mm
Wavelength: 0.94 μm
Spot size: 7×6 mm
Laser output: 1000 to 1500 W
Processing speed: 500 to 1000 mm/min.
Beam absorbent: absent After the laser hardening, the surface hardness of the guide bracket 2 was measured, and the results substantially similar to those shown in FIG. 4 were obtained.

In the case of the guide members 8, it is sufficient if hardening is conducted with respect to only the portions thereof that are brought into sliding contact with the lock gears 4 and the auxiliary lock gears 5. However, if it is necessary, when a large load is applied to the guide members 8, to reduce the deformation of the guide members 8 as little as possible, it is preferred that the heat treatment be conducted with respect to the entire outer circumference of each of the guide brackets 8.

It is to be noted here that although a method of making a component part of a reclining device according to the present invention has been described hereinabove, taking the case of the reclining device having the lock gears and the auxiliary lock gears, the present invention is not limited to the reclining device of this kind, but is applicable to a reclining device having no auxiliary lock gears.

It is also to be noted that although in the above-described embodiment a semiconductor laser has been employed as the heating source, a YAG laser or a $CO_2$ laser can be employed, though it has such a drawback that the spot size is small.

According to the present invention, hardening and tempering are conducted with respect to a predetermined portion of a component part of the reclining device to increase the strength and the wear and abrasion resistance thereof with other portions left as a base material. Accordingly, even if the portions left as the base material are welded to a separate member such as, for example, a bracket, no weld cracks occur and, hence, the reclining device according to the present invention can be employed in various automotive vehicles.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of making a component part of a reclining device that is used to adjust an inclination of a seat back with respect to a seat cushion, said method comprising:
   preparing the component part;
   selectively heating a predetermined portion of the component part up to a temperature greater than a transformation point of a material of the component part;
   cooling the component part; and
   leaving portions of the component part other than the predetermined portion as a base material to thereby selectively increase a strength or a wear and abrasion resistance of the component part;
   wherein the reclining device comprises a guide bracket to be secured to one of a seat cushion and a seat back that can be inclined relative to the seat cushion, an internal gear to be secured to the other of the seat cushion and the seat back, a cam rotatably mounted between the guide bracket and the internal gear, and a pair of lock gears interposed between the guide bracket and the internal gear so as to be radially slidable in association with rotation of the cam, and wherein the component part comprises at least one of the guide bracket, the internal gear, the cam, and the pair of lock gears;
   wherein the guide bracket comprises a plurality of guide members for guiding the pair of lock gears so as to be slidable relative thereto, and wherein heat treatment is selectively conducted with respect to a portion of an entire outer circumference of each of the plurality of guide members; and
   wherein the heat treatment is conducted while the guide bracket is inclined and being rotated with respect to a heating source, and the heating source is being moved.

2. A method of making a component part of a reclining device that is used to adjust an inclination of a seat back with respect to a seat cushion, said method comprising:
   preparing the component part;
   selectively heating a predetermined portion of the component part up to a temperature greater than a transformation point of a material of the component part;
   cooling the component part; and
   leaving portions of the component part other than the predetermined portion as a base material to thereby selectively increase a strength or a wear and abrasion resistance of the component part;
   wherein the reclining device comprises a guide bracket to be secured to one of a seat cushion and a seat back that can be inclined relative to the seat cushion, an internal gear to be secured to the other of the seat cushion and the seat back, a cam rotatable mounted between the guide bracket and the internal gear, and a pair of lock gears interposed between the guide bracket and the internal gear so as to be radially slidable in association with rotation of the cam, and wherein the component part comprises at least one of the guide bracket, the internal gear, the cam, and the pair of lock gears;
   wherein heat treatment is selectively conducted with respect to internal teeth of the internal gear; and
   wherein the heat treatment is conducted from inside the internal teeth while the internal gear is inclined and being rotated with respect to a heating source.

3. The method according to claim 1, wherein a laser is employed as a heating source.

4. The method according to claim 3, wherein the laser is a semiconductor laser.

5. The method according to claim 2, wherein a laser is employed as a heating source.

6. The method according to claim 5, wherein the laser is a semiconductor laser.

* * * * *